United States Patent [19]

Grohmann

[11] Patent Number: 4,908,070
[45] Date of Patent: Mar. 13, 1990

[54] PROCESS AND DEVICE FOR THE LONGITUDINAL CUTTING OF CONTINUOUS CASTINGS

[75] Inventor: Paul Grohmann, Maria Enzersdorf, Austria

[73] Assignee: Messer Griesheim GmbH, Fed. Rep. of Germany

[21] Appl. No.: 237,134

[22] Filed: Aug. 26, 1988

[30] Foreign Application Priority Data

Sep. 9, 1987 [DE] Fed. Rep. of Germany ....... 3730150

[51] Int. Cl.⁴ .............................................. B23K 7/00
[52] U.S. Cl. ..................................... 148/9 R; 266/48; 266/50
[58] Field of Search ................... 148/9 R; 266/48, 50, 266/55

[56] References Cited

U.S. PATENT DOCUMENTS

| 4,478,393 | 10/1984 | Komma et al. | 266/50 |
| 4,501,624 | 2/1985 | Lotz | 148/9 R |
| 4,765,846 | 8/1988 | Grohmann | 148/9 R |

*Primary Examiner*—S. Kastler
*Attorney, Agent, or Firm*—Connolly and Hutz

[57] ABSTRACT

In longitudinal cutting of continuous castings with high pressure, liquid stream cutting tips, a preheating torch conducted to the liquid stream cutting tip is used for heating up to the ignition temperature.

9 Claims, 1 Drawing Sheet

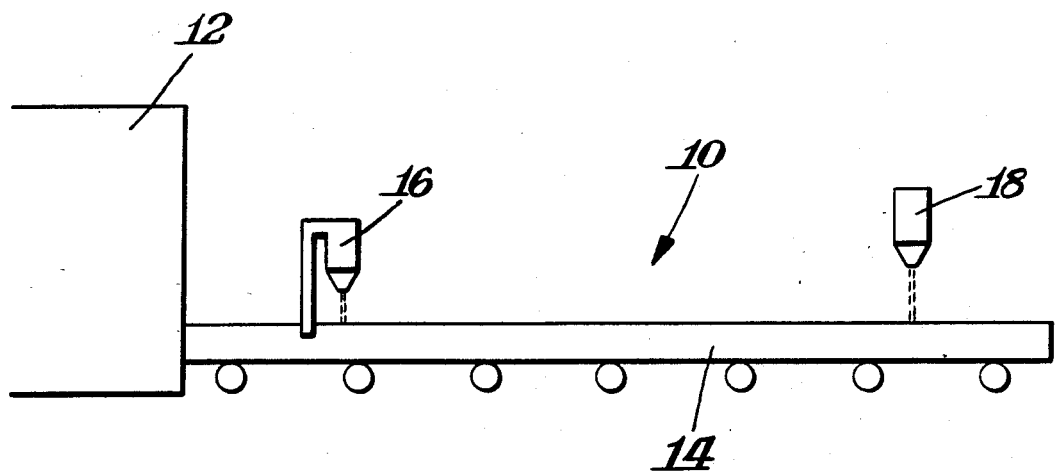

PROCESS AND DEVICE FOR THE LONGITUDINAL CUTTING OF CONTINUOUS CASTINGS

BACKGROUND OF INVENTION

An essential prerequisite for the production of cut surfaces having a high surface quality and dimensional uniformity is a cutting tip free of slag spatter and contamination. It is known that in autogenous cutting, the beginning of the cut must be heated to ignition temperature so that the exothermal reaction required for the cutting process is attained. For this purpose, the cutting oxygen bore is usually surrounded by a crown of heating flames.

The cut is usually started on the stationary workpiece from one workpiece edge whereby the cutting torch is moved to the edge and the heating flames heat the site of the edge to ignition temperature. Depending on the thickness of the workpiece, this process takes several minutes. When the ignition temperature has been reached, the cutting oxygen is turned on and the movement of the torch is started.

In an acetylene-oxygen flame, the hottest place is found just in front of the peak of the brilliant flame cone. The distance of the cutting tip from the workpiece surface should, therefore, only be such that the peaks of the flame cones almost touch so that the heat capacity can be fully utilized. At the start of the cutting process, the torch is raised to prevent adhesion of spatters.

In longitudinal cutting of castings continuously emerging from continuous installations, the problem occurs that at the beginning of the casting the starting piece is in contact and the workpiece is moving so that the cut must be started with the socalled hole punching process. The cutting torch with its heating flames is then closely arranged above the casting, as described above, and the casting surface is heated to ignition temperature. When this temperature has been reached, the cutting oxygen valve is slowly opened up to the required maximum pressure and the torch is simultaneously raised as a function of the thickness of the sheet. The cutting stream penetrates the sheet and the slag spatters upward until the cutting stream emerges from the bottom of the casting.

Since the described hole punching process requires some time, the torch cannot be arranged stationary but during hole punching must be moved along with the casting. This represents apparative expense and an extended roller bed.

SUMMARY OF THE INVENTION

The invention is, therefore, based on the objective of providing a process in which hole punching of a continuously moving casting is possible in spite of a stationary arranged high pressure, liquid stream cutting tip.

The invention is based on the concept of a local and time-related separation of the two phases of the hole punching process: heating up of the punching site to ignition temperature and punching as well as cutting start.

This division makes the incorporation possible of the time needed for hole punching into the existing movement of the casting. An extension of the roller bed is eliminated. The moving device for the preheating torch can be simply designed.

THE DRAWING

The single figure schematically illustrates a device for practicing this invention.

DETAILED DESCRIPTION

It was surprisingly demonstrated that even for thick work-pieces, hole punching takes place so rapidly that it can be said that a flying cutting start with a stationary high pressure, liquid stream cutting tip is obtained.

As a preheating torch, one or more autogenous torches or plasma torches are advantageously employed. The use of torches with heating flames arranged in succession in a row is especially useful, in particular, at high casting speeds.

The synchronization of the movement of the preheating torch with the movement of the casting, as is known from transverse cutting can take place by clamping the preheating torch device to the casting. Just before the liquid stream, cutting tip is reached, the clamp is loosened and the preheating torch stops in front of the cutting tip.

But the invention is not limited to this type of movement synchronization. The invention is particularly advantageously applied in curved continuous casting installations. A preferred cutting agent is liquid oxygen emerging from the cutting tip at pressures exceeding 100 bar.

A particular shape of the high pressure, liquid stream cutting tip resides in a central outlet for the liquid oxygen stream emerging under a pressure of 100 to 600 bar. Such a cutting tip can be used for hole punching and longitudinal cutting. the cutting tip according to one embodiment of the invention can be pivotally arranged for the purpose of hole punching. Another advantageous embodiment resides in the production of a relative movement between the cutting tip and the casting during hole punching.

The surfaces of the casting often have a layer of scales which reduces the cutting speed. To prevent this disadvantage, a descaling torch is often directed to the area in front of the cutting site or this area is singed.

The preheating torch is equipped with a device for regulating the heat capacity in order to consider the different heat requirement for hole punching and cutting.

The single FIGURE schematically illustrates a device 10 for the longitudinal cutting of a continuous casting 14 as it emerges from a casting installation 12. As shown therein a cutting tip 18 is mounted downstream from the casting installation 12 and a preheater 16 is clamped to the casting 14 for synchronous movement with the casting 14.

What is claimed is:

1. In a process for the longitudinal cutting of a continuous casting as it emerges from a continuous casting installation, including the steps of heating the casting to the ignition temperature, and longitudinally cutting the casting by means of a high pressure jet of liquid oxygen, the improvement being in mounting a stationary cutting tip downstream from the continuous casting installation to direct the high pressure jet of liquid oxygen toward the path of travel of the continuous casting, mounting a preheater to the continuous casting after it emerges from the continuous casting installation, synchronously moving the preheater with the continuous casting toward the cutting tip, heating the continuous casting by the preheater during the suynchronous movement of the preheater and the continuous casting, stopping movement of the preheater immediately before the cutting tip is reached, and moving the continuous casting past the cutting tip to longitudinally cut the continuous casting by means of the liquid oxygen stream emerging from the cutting tip.

2. In a device for the longitudinal cutting of a continuous casting including a continuous casting installation for producing the continuous casting, heating means downstream from the continuous casting installation for heating the casting to its ignition temperature, and cutting means downstream from the continuous casting installation for longitudinally cutting the casting, the improvement being in that said cutting means comprises a stationary cutting tip for directing a high pressure jet of liquid oxygen toward the path of travel of the casting, said heating means being a preheater, means for mounting said preheater to said casting for synchronous movement of said preheater and the casting, and said means for mounting said preheater to the casting being operative along a path downstream from said continuous casting installation to a location immediately before said cutting tip whereby the casting is heated by said preheater during the synchronous movement and the casting is longitudinally cut by said cutting tip after the synchronous movement is stopped.

3. Device according to claim 2, wherein said preheater is an autogenous torch.

4. Device according to claim 2, wherein said preheater is a plasma torch.

5. Device according to claim 2, wherein said preheater has heating flames arranged in succession in a row.

6. Device according to claim 5, wherein said preheater is mounted to be clamped to the casting.

7. Device according to claim 4, wherein said preheater is mounted to be clamped to the casting.

8. Device according to claim 3, wherein said preheater is mounted to be clamped to the casting.

9. Device according to claim 2, wherein said preheater is mounted to be clamped to the casting.

* * * * *